Patented Dec. 19, 1922.

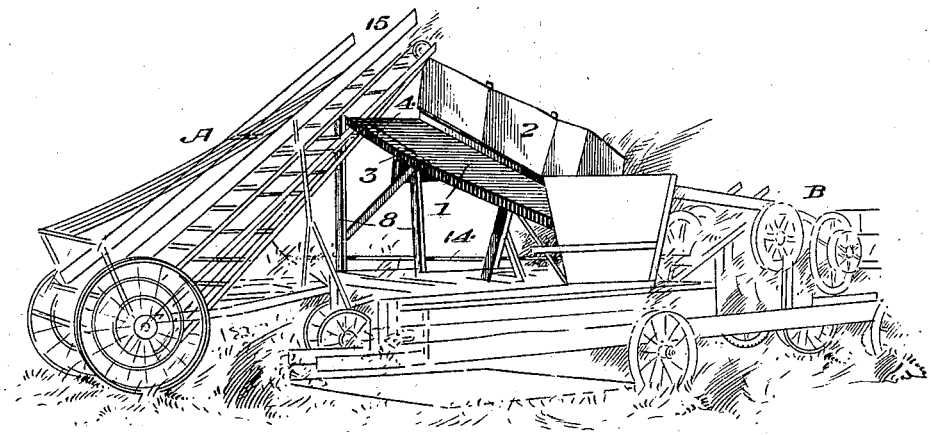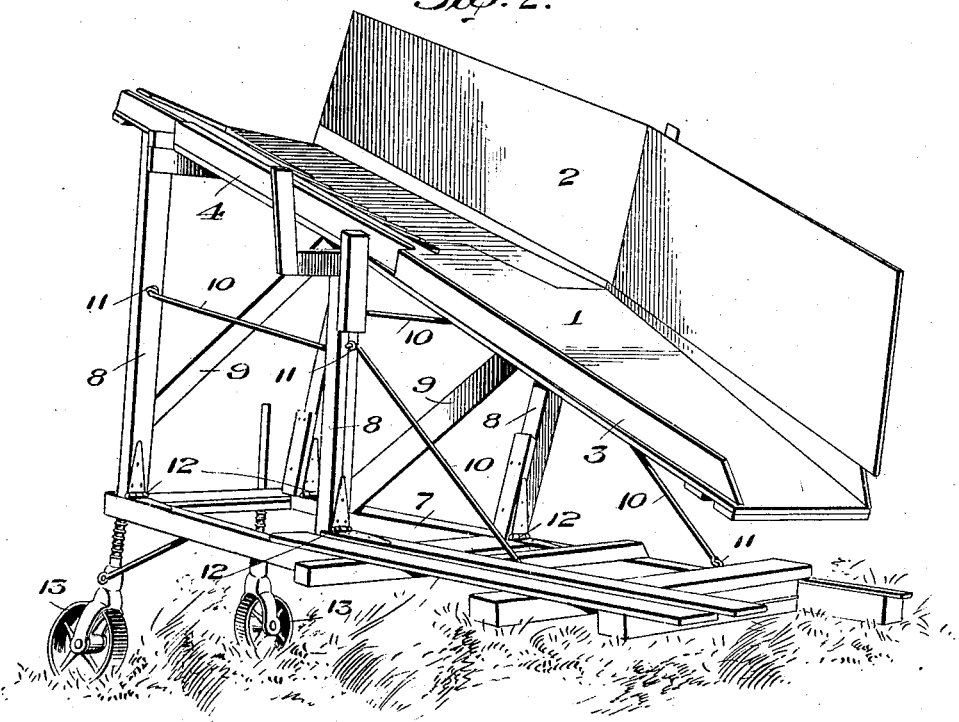

1,439,541

UNITED STATES PATENT OFFICE.

WILLIAM J. FREEZE, OF NEWARK, ARKANSAS.

CHUTE.

Application filed November 13, 1919, Serial No. 337,791. Renewed October 10, 1922. Serial No. 593,661.

*To all whom it may concern:*

Be it known that I, WILLIAM J. FREEZE, a citizen of the United States, residing at Newark, in the county of Independence and State of Arkansas, have invented certain new and useful Improvements in Chutes, of which the following is a specification.

My invention relates to an improvement in chutes.

The object is to provide an attachment for hay balers, its purpose being to occupy an intermediate position between the hay loader and the baler and its function is therefore to conduct the hay from one machine to and into the other thereby saving handling and consequently the labor of several hands and teams which means less handling and attendant cost.

In the accompanying drawings,

Figure 1, is a view in perspective showing the general relation of the machines employed in this baling operation; and Figure 2, is a view in perspective of the chute.

A, represents a form of hay loader, and B, is a baler.

Between these is placed my improvement in the form of a chute, the loader discharging into its upper end, and the chute in turn discharging into the baler.

The numeral 1, represents the bottom of the chute, 2, is one side and 3, is the other side, the side 2, being relatively high and the side 3, relatively low, and the two extending approximately parallel with each other, and on opposite sides of the bottom.

The numeral 4, indicates a table which is located beneath the mouth of the loader, and at one edge of the chute and at the upper end thereof as shown in Figure 2.

Beneath the chute is a platform 7, for the support of the chute. Uprights extend from the platform to the chute. There are several of these uprights and they are designated by the numeral 8, as they are all substantially alike except as to length. These are connected by braces 9, and rods 10, through screw eyes 11, or the like. The uprights are preferably hinged, as at 12, to the platform, so that they may be folded when not in use, the rods 10, being employed to hold them in position when erected. Two of the rods 10 are swingingly connected to the platform just ahead of the forward uprights and are designed for engagement with eyes disposed in the front faces of said uprights, so that the latter may be held erect when elevated. The remaining rods 10 of which there are two are swingingly connected to the rear face of the forward uprights and extend to the rear uprights where they connect with eyes disposed in the front faces of the latter, thus securing the rear uprights in erect position when elevated.

The entire chute is preferably mounted on crazy wheels, 13, adjustable in height.

Guy-rod 14, is used to connect the chute with the baler if desired. The numeral 15, indicates the loader hitch.

The bottom of the chute may taper if desired.

My improved attachment is a simple means to save a great deal of the handling of the hay, which has hitherto been necessary. The grade of hay is greatly improved by decreased handling, and balers of any capacity may be operated without any decrease in their baling capacity by the use of this machine, because it can be fed just as fast as the loader can supply it with hay; in other words its capacity is only limited by the capacity of the loader to feed it.

I claim,

A device for the purpose indicated comprising a platform, vertically adjustable crazy wheels supporting the platform, an inclined chute, uprights hingedly connected to the platform at their lower ends and designed when extended to support the chute in inclined planes, and rods and associated eyes of which the latter are mounted on the uprights, certain of the said rods being swingingly attached to the platform for engagement with the eyes on adjacent uprights and the other of said rods being swingingly attached to certain of said uprights for engagement with the eyes of the next succeeding uprights.

In testimony whereof I affix my signature.

WILLIAM J. FREEZE.